United States Patent [19]
Rhodes

[11] 3,846,709
[45] Nov. 5, 1974

[54] LASER SYSTEM EMPLOYING STIMULATED MULTIPLE-PHOTON EMISSION PROCESS

[75] Inventor: Charles K. Rhodes, Pleasanton, Calif.

[73] Assignee: The United States of America as represented by the United States Atomic Energy Commission, Washington, D.C.

[22] Filed: Feb. 9, 1973

[21] Appl. No.: 331,154

[52] U.S. Cl................................. 330/4.3, 331/94.5
[51] Int. Cl............................................ H01s 3/10
[58] Field of Search..................... 331/94.5; 330/4.3

[56] References Cited
UNITED STATES PATENTS
| | | | |
|---|---|---|---|
| 3,582,814 | 6/1971 | Duguay et al. | 331/94 JL |
| 3,641,454 | 2/1972 | Krawetz | 331/94.5 |
| 3,673,513 | 6/1972 | Gregg et al. | 331/94.5 |

OTHER PUBLICATIONS
Krawetz, et al., "Vacuum U-V . . . with Pulsed High Energy e Beams," 5/17/72, 27 pp., UCRL-73777.

Channing et al., "Generation of U-V...by Frequency Multiplication," 66, pg. 159-160, 1-F, Physics, Vol. 6, G.B.

DeMaria et al., "Ultrafast Laser Pulses," 7/71, pg. 19-26, Physics Today, Vol. 24, No. 7.

Wallace et al., "Extending Thermability Spectrum," 11/70, pg. 1-8, Laser Focus & Chromatrix Model 1000.

Primary Examiner—Maynard R. Wilbur
Assistant Examiner—N. Moskowitz
Attorney, Agent, or Firm—John A. Horan; Frederick A. Robertson; L. E. Carnahan

[57] ABSTRACT

A laser system which employs a stimulated multiple-photon emission process to produce pulsed outputs of high energy, narrow pulsewidth, and short wavelength, particularly useful in controlled fusion applications. The system basically comprises an oscillator which produces a desired narrow pulse at frequency w which is transmitted to an amplifier through a frequency shifter which converts a fraction of the pulse to a pulse at the required frequency $\omega_{0/2}$, which is subsequently amplified by stimulated two-photon emission.

5 Claims, 4 Drawing Figures

LASER SYSTEM EMPLOYING STIMULATED MULTIPLE-PHOTON EMISSION PROCESS

BACKGROUND OF THE INVENTION

The invention described herein was made in the course of, or under, Contract No. W-7405-ENG-48 with the United States Atomic Energy Commission.

Controlled fusion processes, employing coherent optical pulses as the fusion-initiating energy input, require a laser system capable of producing pulsed outputs of large energy, short wavelength (ultraviolet), and narrow pulsewidth. In the last few years much effort has been directed to the development of such a laser system and great advances in the art have been made. However, a need still exists for a laser system capable of producing outputs of high energy, narrow pulsewidth, and short wavelength.

SUMMARY OF THE INVENTION

The present invention, which provides a laser system having the above-mentioned needed capabilities, is based on the observation that certain excited media which are forbidden to radiate by the emission of a single quantum can generally radiate through an appropriate two-quantum process. Such media can store large quantities of energy, yet present no optical gain unless illuminated by a sufficiently intense electromagnetic wave. The inventive system comprises basically a conventional single pulse, mode-locked oscillator which produces a narrow pulse at a certain frequency; a frequency shifter which converts a fraction of this pulse to a pulse at the required frequency, and an amplifier with an active medium therein allowing stimulated multiple-photon emission, and being stored chemically or excited by energetic electron beams or chemically, which amplifies the pulse.

Therefore, it is an object of the invention to provide a laser system employing stimulated multiple-photon emission process.

A further object of the invention is to provide a laser system capable of producing pulsed outputs of high energy, narrow pulsewidth, and short wavelength.

Another object of the invention is to provide a laser system having the above-mentioned capabilities resulting from a stimulated multiple-photon emission process.

Other objects of the invention will become readily apparent from the following description and accompanying drawings.

DESCRIPTION OF THE INVENTION

Figure 1A:
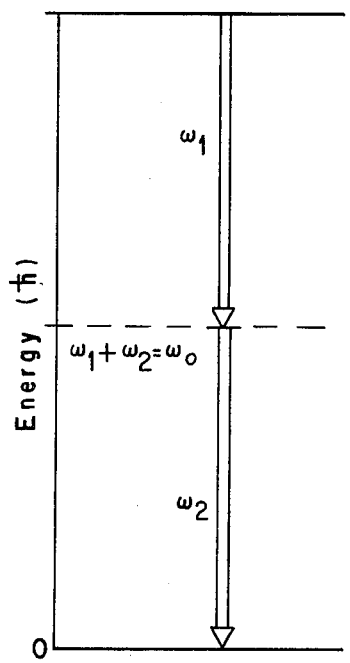
FIGS. 1A and 1B graphically show the general scattering events of stimulated multiple-photon emission processes.
Figure 1B:
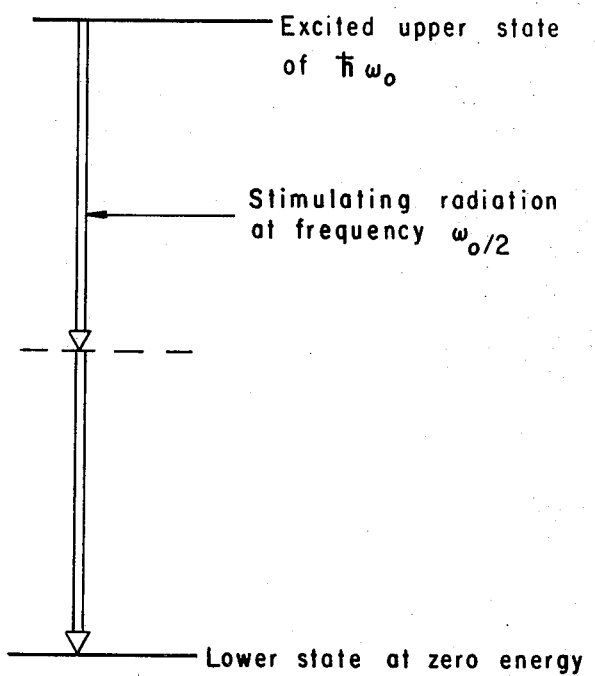

The present invention provides a laser system capable of producing pulsed output of large energy, short wavelength (ultraviolet), and narrow pulsewidth, and is based on the observation that certain excited media which are forbidden to radiate by the emission of a single quantum can generally radiate through an appropriate two-quantum process. Because these normally weak, spontaneous two-quantum processes have corresponding stimulated analogues, such media exhibit the attractive property that they can store large quantities of energy, yet present no optical gain unless illuminated by a sufficiently intense electromagnetic wave. One such analogue process, employed in the present laser system, is stimulated multiple-photon emission from such a medium when appropriately excited. The general scattering events of this process are shown in FIG. 1A and FIG. 1B.

Figure 2:
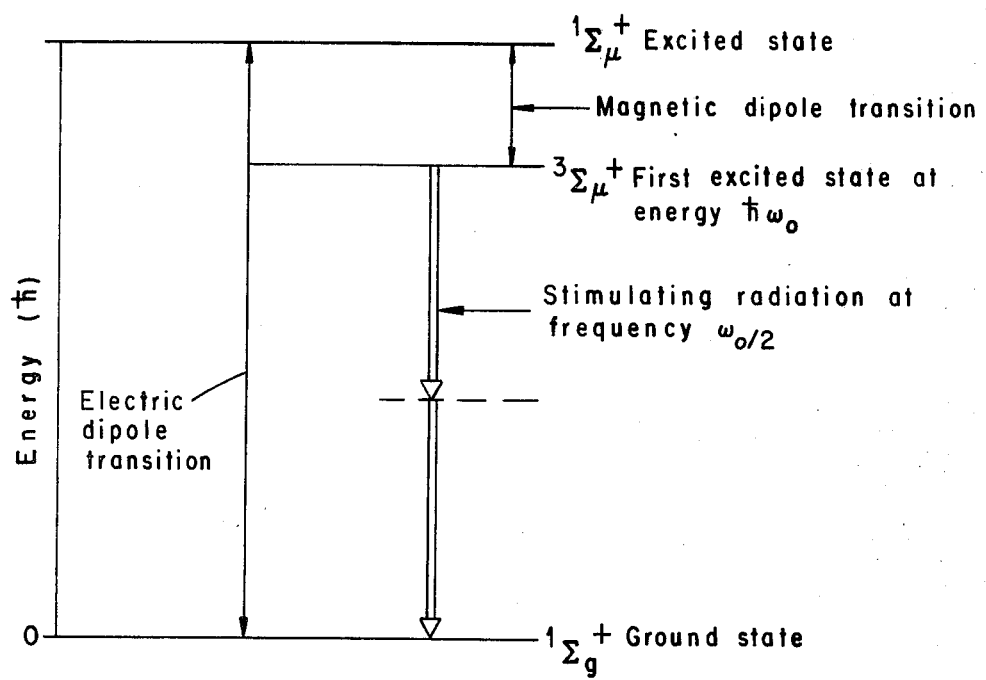
FIG. 2 illustrates the partial energy level diagrams valid for $He_2$ and $Xe_2$.

To exemplify the concept of stimulated two-photon emission, for example, consider the particular case characteristic of the excited rare gas dimers ($He_2^*$, $Ne_2^*$, $Ar_2^*$, $Kr_2^*$, $Xe_2^*$, and also heteroatomic species such as $NeAr^*$) and the partial energy level diagrams valid for $He_2$ and $Xe_2$ shown in FIG. 2. The energy being extracted is assumed to reside in the excited $3\Sigma_\mu{}^+$ state. The two-photon process goes quantum mechanically through intermediate states, one of which is the $1\Sigma_\mu{}^*$ state, by the magnetic dipole amplitude connecting the $3\Sigma_\mu{}^+$ and $1\Sigma_\mu{}^*$ leads. It is to be noted that the process is not limited to the use of molecular electronic levels; analogous processes are possible for atomic electronic states, and molecular vibrational (e.g., vibrationally excited $H_2$ or $N_2$) and rotational states.

Tests directed to methods for the generation and amplification of energetic short optical pulses using stimulated two-quantum processes have been carried out. One example involved molecular hydrogen excited in a transverse electron beam machine. Kinetics calculations which follow the individual rotational-vibrational level populations show that for sufficiently high beam current approximately 100 joules/liter can be stored in the inversion of the $O_1(2)$ (i.e., $\nu=1$, $j=0$ to $\nu=0$, $j=2$) transition when para-hyrogen at five amagat units and 77°K is pumped by electron collisions in a transverse electron beam device. With a vibrational $p\tau$ of $\sim 300$ $\mu$sec-atmospheres the energy storage properties of vibrating molecular hydrogen are quite favorable.

Recent studies of rare gas mixtures by relativistic electron beams (see paper "Vacuum Ultraviolet Studies of Rare Gases and Rare Gas Mixtures Excited with Pulsed High Energy Electron Beams," by B. Krawetz and C. Rhodes, published in the Proceedings of the Symposium on High Power Molecular Lasers, May 15–17, 1972, Quebec, Canada) provide strong evidence for the possible generation of large inverted atomic metastable populations. The experiments indicate a rapid energy transfer between $Ar_2^*(1\Sigma_\mu{}^+)$ or $Ar_2^*(3\Sigma_\mu{}^+)$ molecules and an impurity of xenon atoms in the nearly resonant process.

Collisions with argon atoms and slow electrons can quench the $1_{p_1}$ population to the lowest atomic excited state, the radiatively metastable $3_{p_2}$. Under appropriate conditions, it appears that this mechanism can transfer nearly all of the xenon impurity to the $3_{p_2}$ level. In this case, a relatively modest impurity concentration of $10^{17}$ $cm^{-3}$ corresponds to approximately 200 joules/liter stored.

Figure 3:
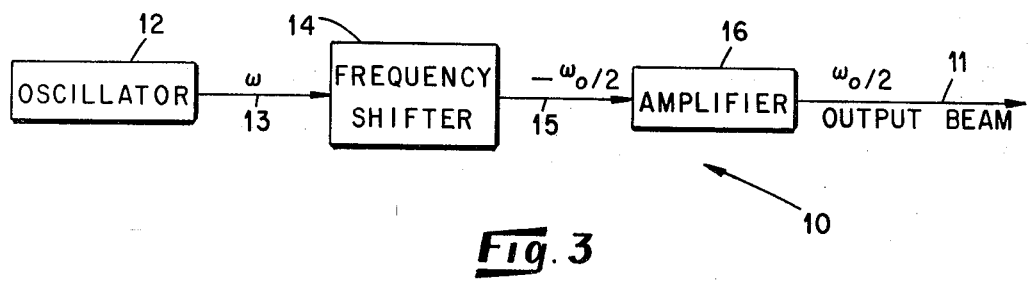
FIG. 3 diagrammatically illustrates an embodiment of the inventive laser system based on the stimulated two-photon emission process.

A particular embodiment of the inventive laser system, based on the above-described stimulated two-photon emission process, is shown in FIG. 3, generally indicated at 10 producing a high energy, short wavelength, narrow output beam or pulse 11, and comprises a conventional single pulse, mode-locked oscillator 12, of the ruby, YAG, or dye type, for example, a conventional frequency shifter 14, and an amplifier 16 with an active medium, such as of the above-described lasing media, allowing stimulated two-photon emission, and being excited by energetic electron beams ($\sim 1$ MeV), such as disclosed in U.S. Pat. No. 3,641,454, issued Feb. 8, 1972, to Barton Krawetz or in U.S. Pat. application Ser. No. 289,029, filed Sept. 14, 1972, now U.S. Pat. No. 3,789,321, issued Jan. 29, 1974, and assigned to the same assignee, or excited chemically.

In operation, the oscillator 12 produces a desired narrow light pulse, indicated at 13, at frequency $w$ (such as 6943 A) which is directed into frequency shifter 14 wherein a fraction (such as 10–90 percent) of the pulse 13 is converted to a pulse, indicated at 15, at the required frequency $\omega_{o/2}$, which in turn is subsequently amplified by stimulated two-photon emission in amplifier 16 producing an output beam or pulsed output 11 of high energy, short wavelength (ultraviolet), and narrow pulse width up to several joules/cm$^2$ visible or near ultraviolet. Such a pulsed output is particularly useful in controlled fusion applications, since it has been predicted that the use of visible or ultraviolet radiation will have a desirable influence on the laser-plasma interaction. Present calculations indicate that a severe decoupling effect may occur in the irradiation of solid targets by light with wavelengths substantially greater than 1 micron. Furthermore, index non-linearities should be quite low on account of the substantially reduced medium density and relatively low concentration of excited material. Also, isolation of the target from the oscillator is easily achieved by the inclusion of dispersive elements between the target and the pulse source.

It has thus been shown that the present invention provides a laser system which employs a stimulated multiple-photon emission process to produce output of high energy, narrow pulsewidth, and short wavelength, such a system being particularly useful in controlled fusion applications.

While particular embodiments have been illustrated or described, modifications will become apparent to those skilled in the art, and it is intended to cover in the appended claims all such modifications as come within the spirit and scope of the invention.

What I claim is:

1. A laser system comprising: an oscillator means for producing a narrow pulse of light at one frequency, a frequency shifter means positioned to receive said pulse from said oscillator means and for converting at least a fraction of said pulse to a pulse at a different frequency, and electron beam activated amplifier means containing an active lasing medium capable of producing stimulated multiple-photon emission when illuminated by an intense electromagnetic wave positioned to receive said different frequency pulsed from said frequency shifter means and for amplifying said different frequency pulse, producing pulsed outputs of high energy, short wavelength, and narrow pulsewidth.

2. The laser system defined in claim 1, wherein said oscillator means is of a single pulse, mode-locked type.

3. The laser system defined in claim 1, wherein said active lasing medium is composed essentially of rare gas dimers.

4. The laser system defined in claim 3, wherein said rare gas dimers are selected from the group of He$_2$*, Ne$_2$*, Ar$_2$*, Kr$_2$*, Xe$_2$*, and heteroatomic species NeAr*.

5. The laser system defined in claim 1, wherein the stimulated multiple-photon emission of the active lasing medium is selected from medium having molecular electronic levels, atomic electronic levels, molecular vibrational states, and rotational states.

* * * * *